United States Patent
Wu et al.

(10) Patent No.: US 10,776,614 B2
(45) Date of Patent: Sep. 15, 2020

(54) FACIAL EXPRESSION RECOGNITION TRAINING SYSTEM AND FACIAL EXPRESSION RECOGNITION TRAINING METHOD

(71) Applicant: NATIONAL CHIAO TUNG UNIVERSITY, Hsinchu (TW)

(72) Inventors: Bing-Fei Wu, Hsinchu (TW); Chun-Hsien Lin, Keelung (TW); Meng-Liang Chung, Changhua County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 67 days.

(21) Appl. No.: 16/255,798

(22) Filed: Jan. 23, 2019

(65) Prior Publication Data
US 2019/0251336 A1 Aug. 15, 2019

(30) Foreign Application Priority Data
Feb. 9, 2018 (TW) .............................. 107104796 A

(51) Int. Cl.
*G06K 9/62* (2006.01)
*G06K 9/00* (2006.01)
(Continued)

(52) U.S. Cl.
CPC ..... *G06K 9/00302* (2013.01); *G06K 9/00268* (2013.01); *G06K 9/54* (2013.01);
(Continued)

(58) Field of Classification Search
CPC .......... G06K 9/00302; G06K 9/00308; G06K 9/00268; G06K 9/00228; G06T 11/00
(Continued)

(56) References Cited

U.S. PATENT DOCUMENTS

| 7,587,069 B2 | 9/2009 | Movellan et al. |
| 10,636,175 B2 * | 4/2020 | Caballero ............... G06T 11/00 |

(Continued)

FOREIGN PATENT DOCUMENTS

| CN | 104463103 A | 3/2015 |
| CN | 105654049 A | 6/2016 |

(Continued)

OTHER PUBLICATIONS

Ronghang Zhu et al., "Discriminative feature adaptation for cross-domain facial expression recognition," IEEE (International Conference on Biometric), 2016.

(Continued)

*Primary Examiner* — Charlotte M Barker
(74) *Attorney, Agent, or Firm* — CKC & Partners Co., LLC

(57) ABSTRACT

A facial expression recognition training system includes a training module, feature database, a capturing module, a recognition module and an adjusting module. The training module trains a facial expression feature capturing model according to known face images. The feature database stores known facial expression features of the known face images. The capturing module continuously captures first face images, and the facial expression feature capturing model outputs facial expression features of the first face images according to the first face images. The recognition module compares the facial expression features and the known facial expression features, and fit the facial expression features to the first known facial expression features that is one kind of the known facial expression feature accordingly. The adjusting module adjusts the facial expression feature capturing model to reduce the differences between the facial expression features and the known facial expression features.

8 Claims, 8 Drawing Sheets

(51) Int. Cl.
G06K 9/54 (2006.01)
G06T 3/20 (2006.01)
G06T 5/00 (2006.01)
G06T 3/60 (2006.01)

(52) U.S. Cl.
CPC ......... *G06K 9/6201* (2013.01); *G06K 9/6217* (2013.01); *G06T 3/20* (2013.01); *G06T 3/60* (2013.01); *G06T 5/003* (2013.01); *G06T 2207/20081* (2013.01); *G06T 2207/20084* (2013.01); *G06T 2207/30201* (2013.01)

(58) Field of Classification Search
USPC ....... 382/157, 100, 118, 103, 229, 192, 215, 382/225; 348/333.02, 231.3

See application file for complete search history.

(56) References Cited

U.S. PATENT DOCUMENTS

2014/0242560 A1  8/2014  Emotient
2019/0205625 A1* 7/2019  Luo ........................ G06N 3/088

FOREIGN PATENT DOCUMENTS

| TW | I383325 B | 1/2013 |
| TW | I430185 B | 3/2014 |
| TW | I457872 B | 10/2014 |

OTHER PUBLICATIONS

Wen-Sheng Chu et al., "Selective Transfer Machine for Personalized Facial Expression Analysis," IEEE Transaction on Pattern Analysis and Machine Intelligent, vol. 39, No. 3, Mar. 2017.

* cited by examiner

S240

| shifting each of the first facial images with respect to the reference plane such that a nosal tip feature point in each of the first facial images is aligned with a center point of the reference plane | ~S241 |

| rotating each of the shifted first facial images such that a connection line between two eyes in the each of the shifted first facial images is parallel to a horizontal line of the reference plane, so as to form the second facial image | ~S242 |

Fig. 6

FACIAL EXPRESSION RECOGNITION TRAINING SYSTEM AND FACIAL EXPRESSION RECOGNITION TRAINING METHOD

CROSS-REFERENCE TO RELATED APPLICATION

This application claims priority to Taiwan Application Serial Number 107104796, filed Feb. 9, 2018, which is herein incorporated by reference in its entirety.

BACKGROUND

Technical Field

The present disclosure relates to a training system and a training method, and more particularly to a facial expression recognition training system and a facial expression recognition training method.

Description of Related Art

With the advancement of technology, the technology of face recognition has developed into facial expression recognition, in other words, various facial expressions of facial images such as happiness, surprise, sadness, anger, disgust, amazement, grief, etc. can be recognized through the facial expression recognition training system.

The conventional facial expression recognition training system is trained by utilizing a large amount of marked image data through machine learning, so that this facial expression recognition training system can recognize various facial expressions of the facial image. In other words, after the facial expression recognition training system finishes training, the parameters of the facial expression recognition training system remains unvaried basically unless the marked image data is given again for training. Accordingly, if unmarked image data is input to the facial expression recognition training system, there is a considerable probability for this facial expression recognition training system to recognize incorrectly.

SUMMARY

The present disclosure is to provide a facial expression recognition training system and a facial expression recognition training method.

One aspect of the present disclosure is a facial expression recognition training system including a training module, a feature database, a capturing module, a recognition module and an adjusting module. The training module trains a facial expression feature capturing model according to a plurality of known facial images. The feature database stores a plurality of known facial expression features of the known facial images. The capturing module captures a first facial image, in which the facial expression feature capturing model outputs a facial expression features of the first facial image according to the first facial image. The recognition module compares the facial expression feature with the known facial expression features, and makes the facial expression feature correspond to one of the known facial expression features accordingly. The adjusting module adjusts the facial expression feature capturing model to reduce the differences between the facial expression feature and the known facial expression feature.

According to one embodiment of the present disclosure, the facial expression recognition training system further includes an image calibration module configured to correct the first facial image to form a second facial image, and sharpen the second facial image. The facial expression feature capturing model recognizes and outputs the facial expression feature to the recognition module according to the sharpened second facial image. The recognition compares the facial expression feature which is processed by the image calibration module with the known facial expressions.

According to one embodiment of the present disclosure, the image calibration module is configured to align the facial features of each of the first facial images with each other.

According to one embodiment of the present disclosure, the image calibration module is configured to shift the first facial image with respect to a reference plane such that a nosal tip feature point in the first facial image is aligned with a center point of the reference plane, and rotate the shifted first facial image such that a connection line between two eyes in the shifted first facial image is parallel to a horizontal line of the reference plane, so as to form the second facial image.

According to one embodiment of the present disclosure, the image calibration module uses Difference of Gaussian (DoG), Sobel operator or Laplace operator to sharpen the second facial image.

According to one embodiment of the present disclosure, the facial expression feature capturing model may include convolutional neural network or neural network.

Another aspect of the present disclosure is a facial expression recognition training method including: training a facial expression feature capturing model according to a plurality of known facial images; storing a plurality of known facial expression features of the known facial images; capturing a first facial image, and the facial expression feature capturing model outputting a facial expression feature of the first facial image according to the first facial image; comparing the facial expression feature with the known facial expression features, and making the facial expression feature correspond to one of the known facial expression features accordingly; adjusting the facial expression feature capturing model to reduce the difference between the facial expression feature and the known facial expression feature.

According to one embodiment of the present disclosure, the step of outputting the facial expression feature according to the first facial image includes: correcting the first facial image with respect to a reference plane to form a second facial image; sharpening the second facial image; recognizing the facial expression feature according to the sharpened second facial image.

According to one embodiment of the present disclosure, the step of correcting the first facial image with respect to the reference plane to form the second facial image includes: shifting the first facial image with respect to a reference plane such that a nosal tip feature point in the first facial image is aligned with a center point of the reference plane; rotating the shifted first facial image such that a connection line between two eyes in the shifted first facial image is parallel to a horizontal line of the reference plane, so as to form the second facial image.

According to one embodiment of the present disclosure, the step of sharpening the second facial image includes: using Difference of Gaussian (DoG), Sobel operator or Laplace operator to sharpen the second facial image.

According to one embodiment of the present disclosure, the facial expression feature capturing model may include a convolutional neural network or a neural network.

The present disclosure is to correspondingly adjust the parameters of the facial expression feature capturing model every time performing the facial expression feature recognition on the unmarked facial image, so that the facial expression feature capturing model is continuously trained. Accordingly, the facial expression feature recognition ability is enhanced to achieve the purpose of adaptability and personalization.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 6 is a flowchart of further steps of the step S240 of the facial expression recognition training method shown in FIG. 5.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

Figure 1:
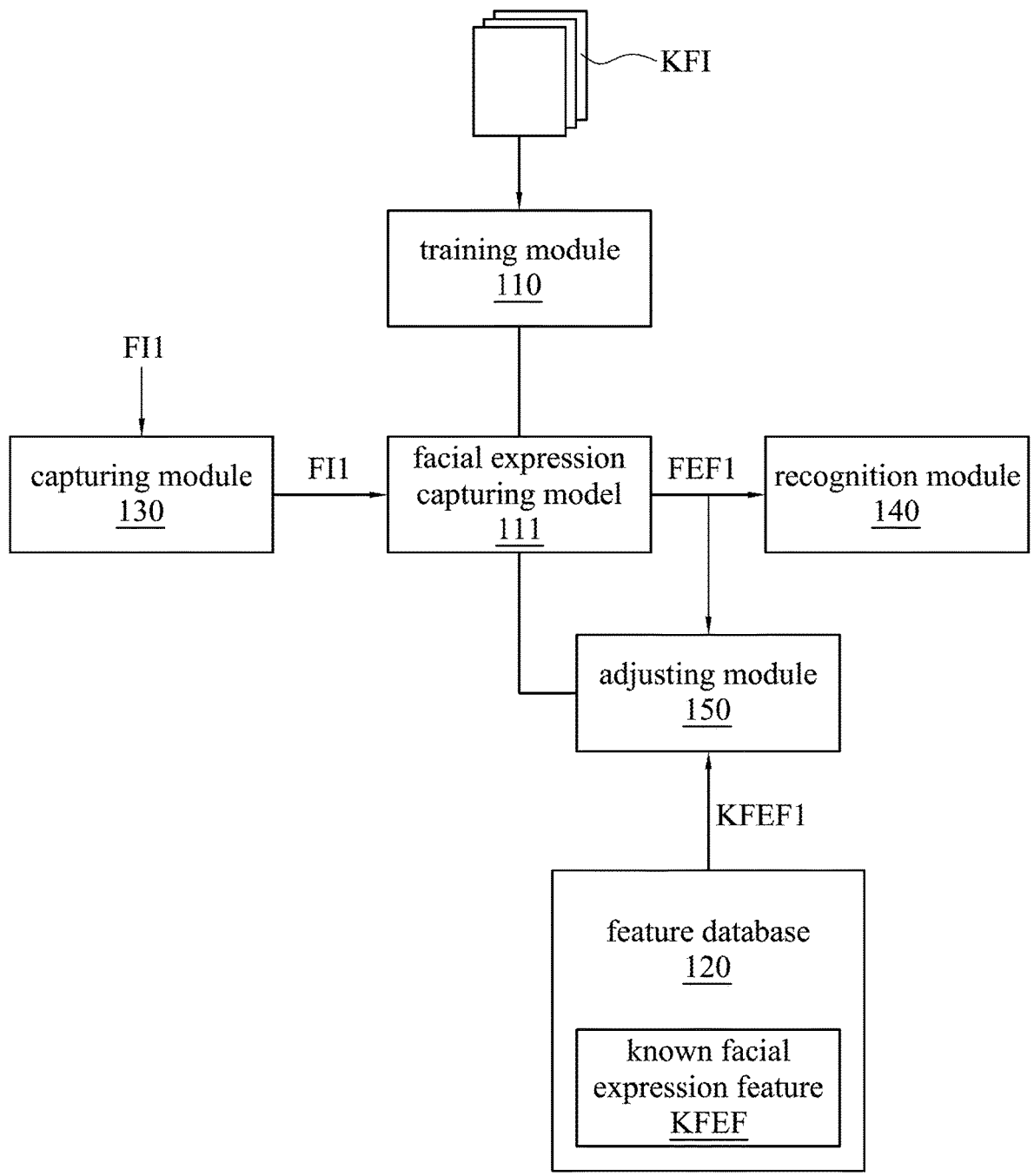
FIG. 1 is a functional block diagram of a facial expression recognition training system according to one embodiment of the present disclosure.

Reference is made to FIG. 1, which illustrates a functional block diagram of a facial expression recognition training system 100 according to one embodiment of the present disclosure.

The facial expression recognition training system 100 includes a training module 110, a feature database 120, a capturing module 130, a recognition module 140 and an adjusting module 150.

The training module 110 is configured to train a facial expression feature capturing model 111 according to plural of known facia images KFI.

In one embodiment, the known facial images KFI may include facial images with various facial expressions such as happiness, surprise, sadness, anger, disgust, amazement, grief, and so on. Since the known facial images KFI with different facial expressions have different known facial expression features KFEF, the training module 110 can train the known facial images KFI according to different known facial expression features KFEF, so as to obtain the corresponding facial expression feature capturing model 111. For example, if the facial expression of the known facial image KFI is happy, the training module 110 generates the facial expression feature capturing model 111 of which the facial expression is happy according to the known facial expression feature KFEF, e.g., the mouth feature is that the corner of the mouth is raised, of the known facial image KFI. On the other hand, if the facial expression of the known facial image KFI is surprised, the training module 110 generates the facial expression feature capturing model 111 of which the facial expression is surprised according to the known facial expression feature KFEF, e.g., the mouth feature is that the mouth is opened, of the known facial image KFI.

In one embodiment, the facial expression feature capturing model 111 may include a convolutional neural network or a neural network.

The feature database 120 is configured to store the known facial expression features KFEF of the known facial images KFI, in which the known facial expression feature KFEF can be represented by a feature vector, and the known facial expression features KFEF corresponding to different facial expressions have different feature vector ranges. For example, the known facial expression feature KFEF, of which the facial expression is happy, has a first feature vector range, and the known facial expression feature KFEF, of which the facial expression is surprised, has a second feature vector range. In other words, the feature vector that falls within the first feature vector range means that the facial expression of the known facial image KFI corresponding to this feature vector is happy, and the feature vector that falls within the second feature vector range means that the facial expression of the known facial image KFI corresponding to this feature vector is surprised.

The capturing module 130 is configured to continuously capture plural of first facial images FI1, and the first facial images FI1 may include facial images with various facial expressions, such as happiness, surprise, sadness, anger, disgust, amazement, grief and so on.

In one embodiment, the capturing module 130 may be a camera, a video camera, a video recorder, or the like.

The facial expression feature capturing model 111 may output the facial expression feature FEF1 according to the first facial image FI1, in which the facial expression feature FEF1 corresponds to the first facial image FI1. In other words, after the first facial image FI1 is recognized by the facial expression feature capturing model 111, the facial expression feature FEF1 of the first facial image FI1 can be outputted. For example, after the first facial images FI1 of happiness, surprise, sadness, anger, disgust, amazement, grief, etc. are recognized by the facial expression feature capturing model 111, the facial expression feature capturing model 111 can output the facial expression features FEF1 of happiness, surprise, sadness, anger, disgust, amazement, anger, grief, and so on.

The recognition module 140 is configured to compare the facial expression feature FEF1 with the known facial expression features KFEF, and make the facial expression feature FEF1 correspond to one of the known facial expression features KFEF accordingly. Taking a facial expression feature FEF1 as an example, the recognition module 140 finds the known facial expression feature KFEF of which the feature vector is closest to the feature vector of the facial expression feature FEF1 among the known facial expression features KFEF, and evaluates a difference between the feature vector of the facial expression feature FEF1 and the feature vector of the found known facial expression feature KFEF. Accordingly, for the remaining facial expression features FEF1, it also can respectively find the known facial expression features KFEF of which the feature vector are closest to their feature vectors in the same way, and evaluate a difference between the feature vector of each of the remaining facial expression features FEF1 and that of the found known facial expression feature KFEF. Further, all evaluated differences are calculated and summed up to obtain a value. Furthermore, when the value is close to the minimum value, the facial expression feature capturing model 111 is established.

The adjusting module 150 is configured to adjust the facial expression feature capturing model 111 to reduce the difference between the facial expression feature FEF1 and the known facial expression feature KFEF1.

It should be noted that the training module 110, the feature database 120, the capturing module 130, the recognition module 140, and the adjusting module 150 may be implemented by hardware, software, firmware, or the combination thereof.

Figure 2:
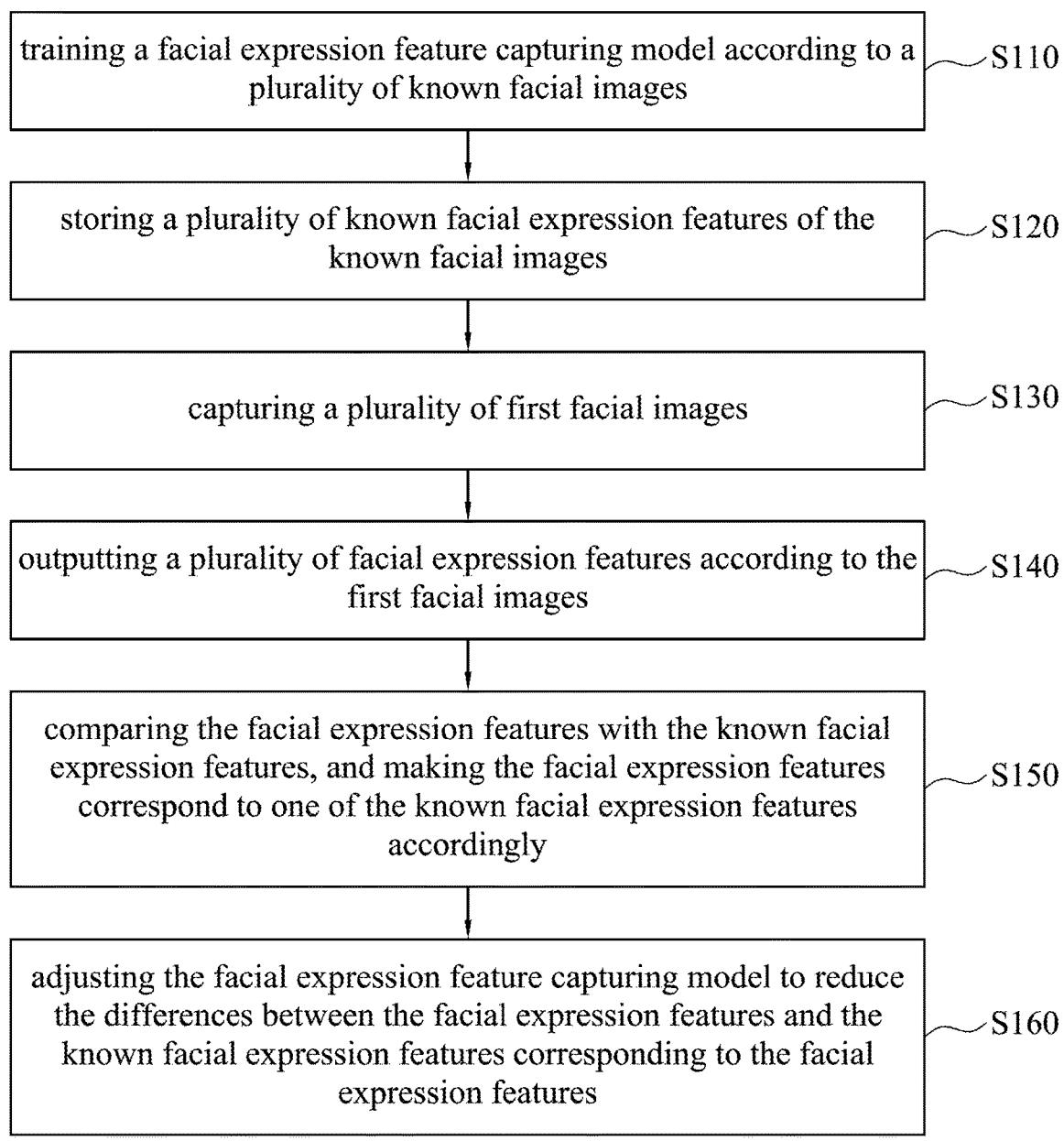
FIG. 2 is a flowchart of a facial expression recognition training method according to one embodiment of the present disclosure.

Reference is made to FIG. 1 and FIG. 2. FIG. 2 is a flowchart of an facial expression recognition training method M100 according to one embodiment of the present disclosure. The facial expression recognition training method M100 shown in FIG. 2 can be applied to the facial expression recognition training system 100 shown in FIG. 1.

In step S110, the training module 110 trains the facial expression feature capturing model 111 according to plural of the known facial images KFI.

In step S120, the feature database 120 stores the known facial expression features KFEF of the known facial images KFI, such as the known facial expression feature KFEF of which the facial expression is happy or surprised.

In step S130, the capturing module 130 captures the first facial image FI1. Specifically, reference is also made to FIG. 3A, which illustrates a schematic diagram of the first facial image FI1 according to one embodiment of the present disclosure. It should be noted that FIG. 3A only takes one first facial image FI1 as an example.

Figure 3A:
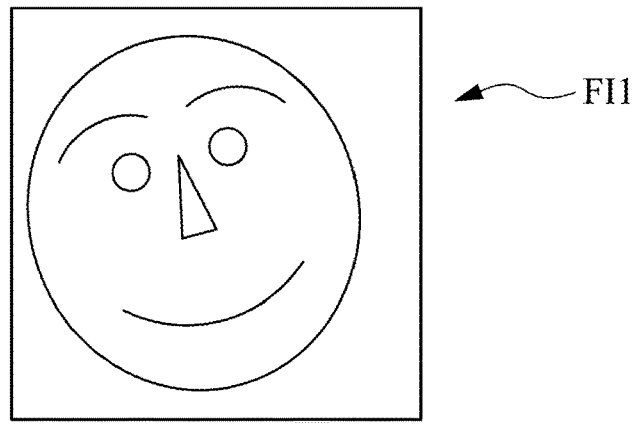
FIG. 3A is a schematic diagram of a first facial image according to one embodiment of the present disclosure.

As shown in FIG. 3A, the first facial image FI1 is exemplified by the facial image of which the facial expression is happy.

Figure 3B:
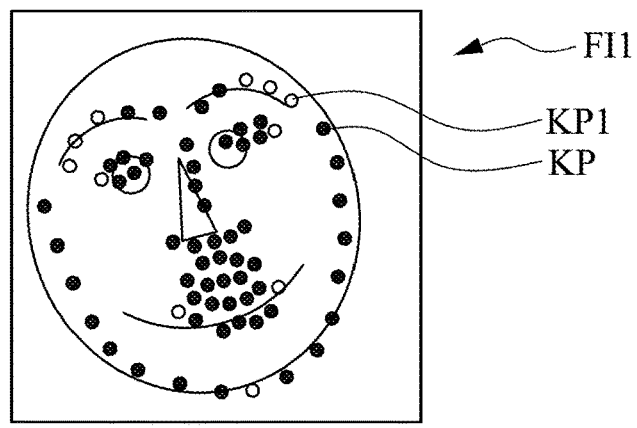
FIG. 3B is a schematic diagram of marking key points in the first facial image shown in FIG. 3A.
Figure 3C:
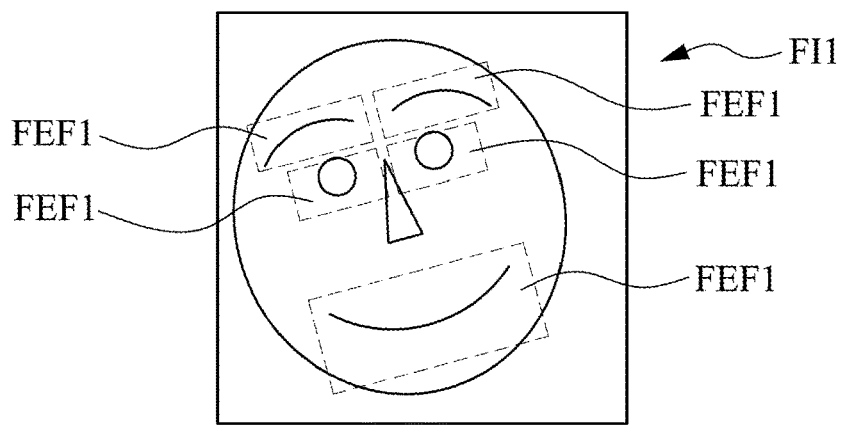
FIG. 3C is a schematic diagram of selecting a facial expression feature in the first facial image shown in FIG. 3A according to the key points shown in FIG. 3B.

In step S140, the facial expression feature capturing model 111 may output the facial expression feature FEF1 of the first facial image FI1 according to the first facial image FI1. Specifically, reference is also made to FIG. 3B and FIG. 3C. FIG. 3B is a schematic diagram of marking key points KP in the first facial image FI1 shown in FIG. 3A. FIG. 3C is a schematic diagram of selecting the facial expression feature FEF1 in the first facial image FI1 shown in FIG. 3A according to the key points KP shown in FIG. 3B.

As shown in FIG. 3B, by the face recognition technology, the left eyebrow, the right eyebrow, the left eye, the right eye, the mouth, the forehead, the nose, and the contour of the face in the first facial image FI1 can be marked with the corresponding key points KP; next, since the first facial image FI1 is oblique, it is necessary to further perform the rotation and shift calibration on the key points KP according to the nosal tip and the connection line between two eyes; finally, the elliptic regression is used to remove the background or other unnecessary features so as to cut off the face and select the first key point KP1 among the key points KP. Specifically, in the present embodiment, the number of the first key points KP1 is eleven, in which each of the left eyebrow and the right eyebrow has three, each of the left eye and the right eye has one, and the mouth has three. It should be noted that the number and the position of the key points KP and the first key point KP1 shown in FIG. 3B are exemplified and it is not limited thereto.

In addition, as shown in FIG. 3C, the first key points KP1 corresponding to the left eyebrow, the right eyebrow, the left eye, the right eye, and the mouth are marked such that the facial expression feature capturing model 111 may select the facial expression feature FEF1 in the first facial image FI1 according to the first key points KP1, in which the facial expression feature FEF1 includes the left eyebrow feature, the right eyebrow feature, the left eye feature, the right eye feature, and the mouth feature.

Furthermore, since the facial expression of the first facial image FI1 is happy, the left eyebrow feature, the right eyebrow feature, the left eye feature, the right eye feature, and the mouth feature of the facial expression features FEF1 should conform to the facial features of happiness, for example, the mouth feature is that the corner of the mouth is raised. On the condition that the mouth feature is the corner of the mouth being raised, it means that the position of the first key point KP1 marked at the corner of the mouth will move upwards while comparing to the expressionless expression.

In step S150, the recognition module 140 compares the facial expression feature FEF1 with the known facial expression features KFEF, and makes the facial expression feature FEF1 correspond to a known facial expression feature KFEF1 of the known facial expression features KFEF. Specifically, since the facial expression feature FEF1 conforms to the facial expression of happiness, the recognition module 140 selects the known facial expression feature KFEF1 that conforms to the facial feature of happiness among the known facial expression features KFEF in the feature database 120, in which the known facial expression feature KFEF1 and the facial expression feature FEF1 are not exactly the same and there is the difference between them. In short, both the facial expression feature FEF1 and the known facial expression feature KFEF1 conform to the facial expression of happiness, but there is the slight difference between them. For example, the mouth features of the facial expression feature FEF1 and the known facial expression feature KFEF1 both are that the corner of the mouth is raised, but the magnitudes of the raises are not exactly the same.

In step S160, the adjusting module 150 adjusts the facial expression feature capturing model 111 to reduce the difference between the facial expression feature FEF1 and the known facial expression feature KFEF1. In detail, the associated parameters of the facial expression feature capturing model 111 can be adjusted by stochastic gradient descent (SCD) to reduce the difference between the facial expression feature FEF1 and the known facial expression feature KFEF1.

The adjusted facial expression feature capturing model 111 can perform more accurate facial expression recognition on the facial image that needs to be processed by the facial expression feature recognition, so that the facial expression feature FEF1 captured by the adjusted facial expression feature capturing model 111 is able to be closer to the known facial expression feature KFEF1 in the feature database 120 to achieve the purpose of adaptability.

Accordingly, every time the facial expression feature capturing model 111 performs the facial expression feature recognition on the unmarked facial image, the adjusting module 150 will correspondingly adjust the parameters of the facial expression feature capturing model 111 so that the facial expression feature capturing model 111 is continuously trained to enhance the facial expression feature recognition ability of the facial expression feature capturing model 111 and achieve the purpose of adaptability and personalization; moreover, it further has the effect of adjusting the parameters of the facial expression feature capturing model 111 online; furthermore, the problem of conceptual drift is also less likely to occur.

Figure 4:
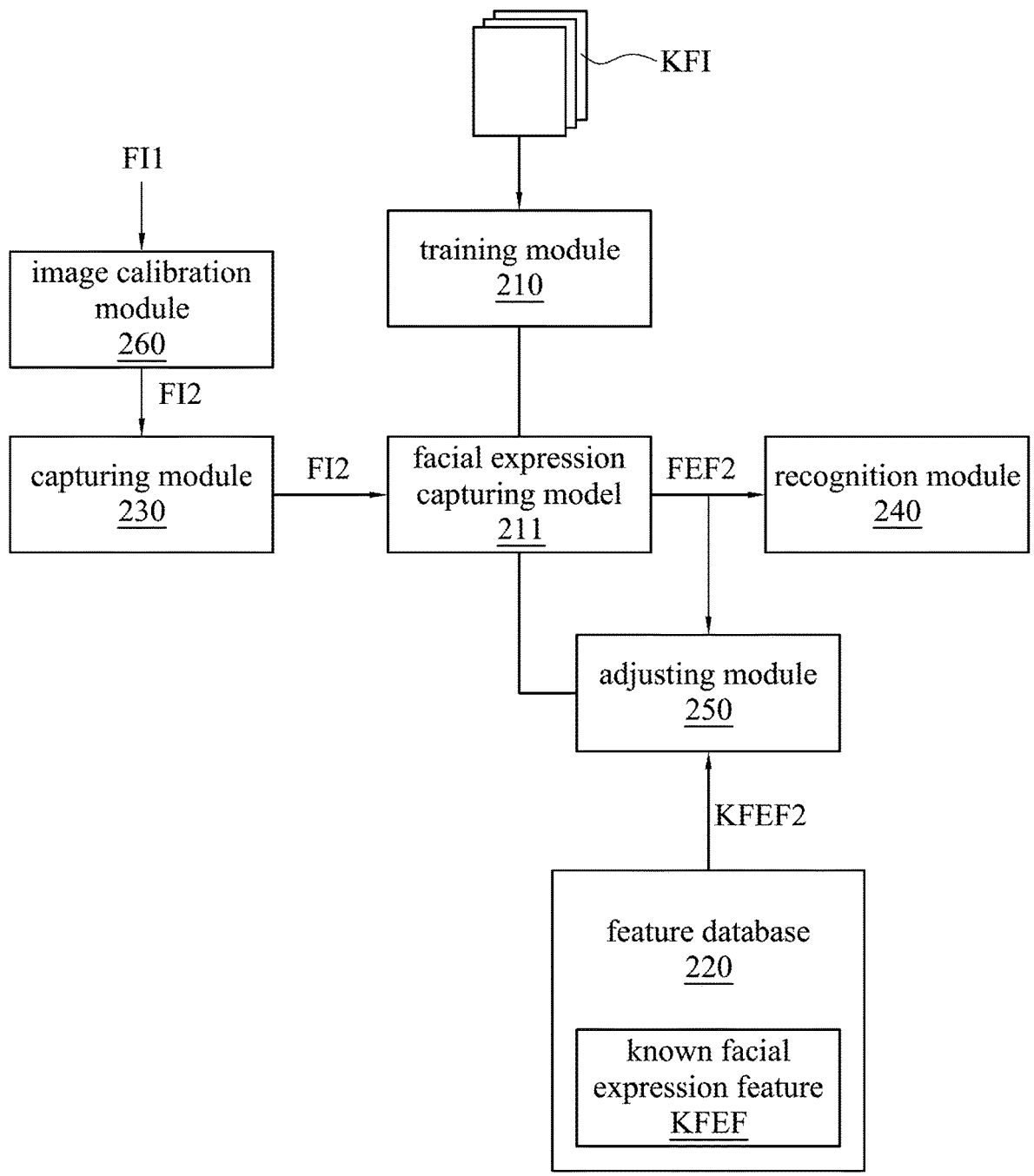
FIG. 4 is a functional block diagram of a facial expression recognition training system according to another embodiment of the present disclosure.

Reference is made to FIG. 4, which illustrates a functional block diagram of a facial expression recognition training system 200 according to another embodiment of the present disclosure.

The facial expression recognition training system 200 includes a training module 210, a feature database 220, a capturing module 230, an recognition module 240, an adjusting module 250, and an image calibration module 260.

The training module 210 is configured to train the facial expression feature capturing model 211 according to plural of known facial images KFI.

In one embodiment, the facial expression feature capturing model 211 can include a convolutional neural network or a neural network.

The feature database 220 is configured to store known facial expression features KFEF of the known facial images KFI.

The capturing module 230 is configured to capture the first facial image FI1.

In one embodiment, the capturing module 230 can be a camera, a video camera, a video recorder, or the like.

The image calibration module 260 is configured to correct and sharpen the first facial image FI1 with respect to a reference plane to form the second facial image FI2. In some embodiments, the image calibration module 260 is configured to align the facial features of each facial image (e.g., the first facial image FI1) with each other.

The facial expression feature capturing model 211 can output the facial expression feature FEF2 of the second facial image FI2 according to the second facial image FI2. In other words, after the second facial image FI2 is recognized by the facial expression feature capturing model 211, the facial expression feature FEF2 of the second facial image FI2 can be outputted.

The recognition module 240 is configured to compare the facial expression feature FEF2 with the known facial expression features KFEF, and make the facial expression feature FEF2 correspond to a known facial expression features KFEF2 of the known facial expression features KFEF.

The adjusting module 250 is configured to adjust the facial expression feature capturing model 211 to reduce the difference between the facial expression feature FEF2 of the second facial image FI2 and the known facial expression feature KFEF2.

It should be noted that the training module 210, the feature database 220, the capturing module 230, the recognition module 240, the adjusting module 250, and the image calibration module 260 can be implemented by hardware, software, firmware, or the combination thereof.

Figure 5:
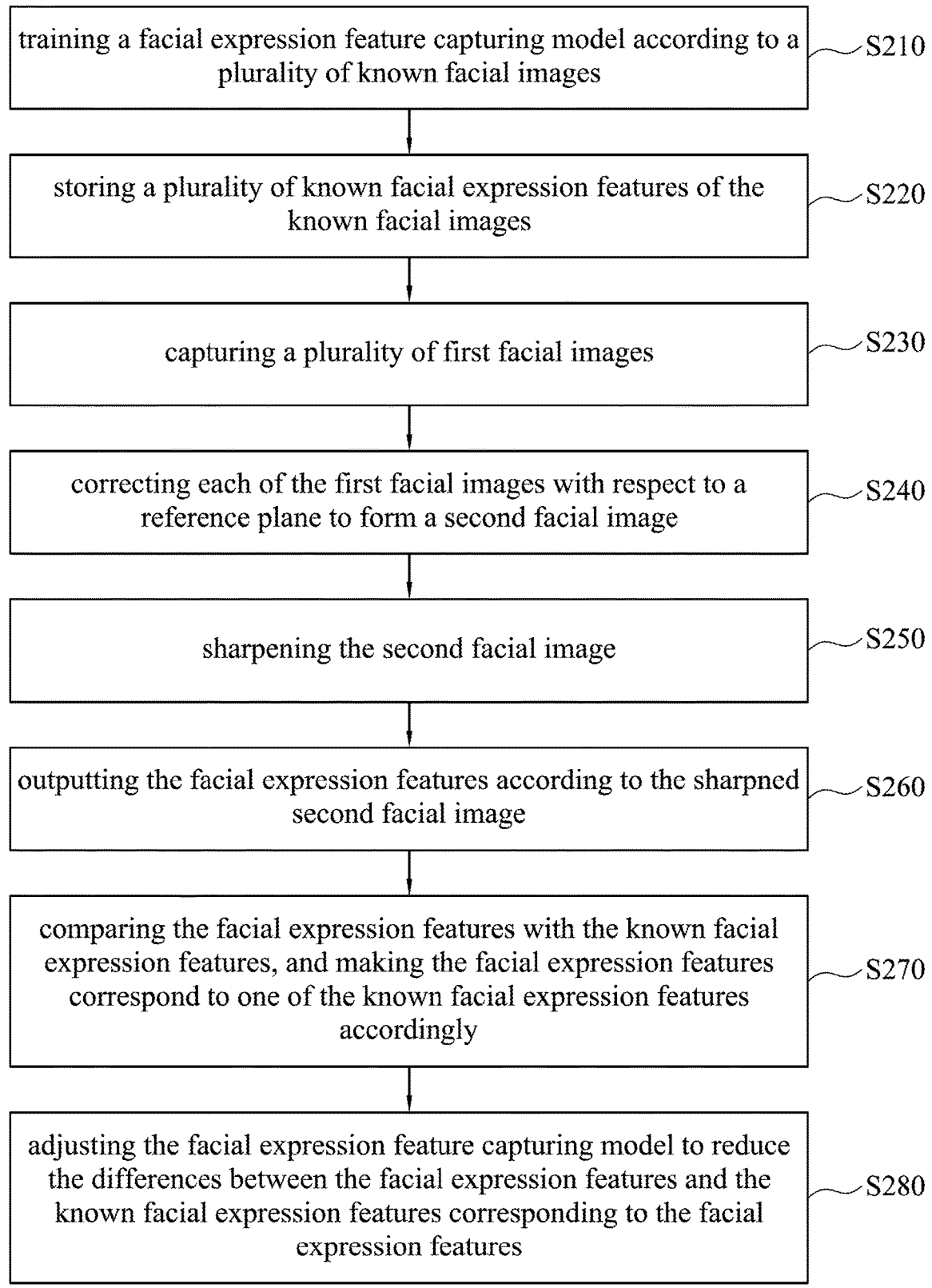
FIG. 5 is a flowchart of a facial expression recognition training method according to another embodiment of the present disclosure.

Reference is made to FIG. 4 and FIG. 5. FIG. 4 is a functional block diagram of the facial expression recognition training system 200 according to another embodiment of the present disclosure. FIG. 5 is a flowchart of a facial expression recognition training method M200 according to another embodiment of the present disclosure.

Steps S210 to S230 of the facial expression recognition training method M200 are substantially similar to the steps S110 to S130 of the facial expression recognition training method M100, and thus further description will not be given herein. Only steps S240 to step S280 will be described below.

In step S240, the image calibration module 260 corrects the first facial image FI1 with respect to the reference plane RS to form the second facial image FI2. Further, reference is also made to FIG. 6, which illustrates a flowchart of further steps of step S240 of the facial expression recognition training method M200 shown in FIG. 5.

Step S240 includes step S241 and step S242.

Figure 7A:
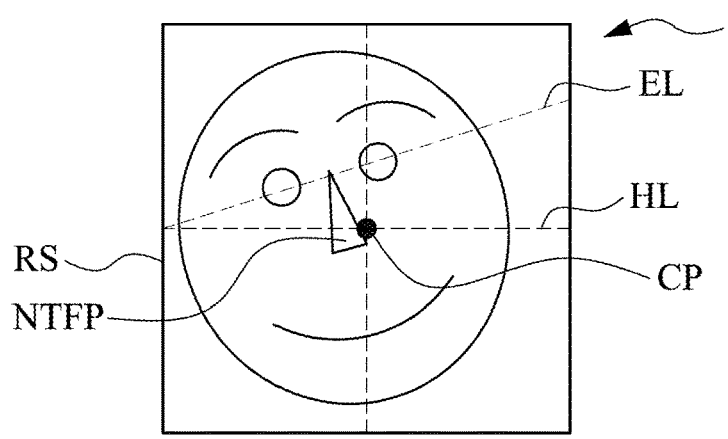
FIG. 7A is a schematic diagram of a first facial image and a reference plane according to one embodiment of the present disclosure.
Figure 7B:
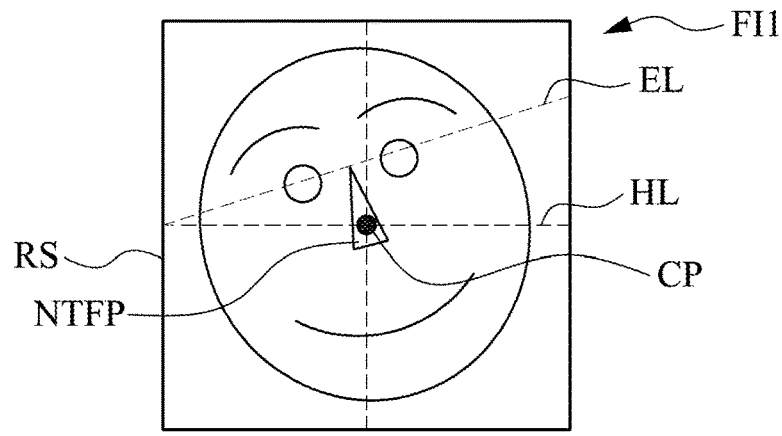
FIG. 7B is a schematic diagram of shifting the first facial image shown in FIG. 7A such that a nosal tip feature point in the first facial image is aligned with a center point of the reference plane.

In step S241, the image calibration module 260 shifts the first facial image FI1 with respect to the reference plane RS such that the nosal tip feature point NTEP in the first facial image FI1 is aligned with the center point CP of the reference plane RS. Specifically, reference is also made to FIG. 7A and FIG. 7B. FIG. 7A is a schematic diagram of the first facial image and the reference plane RS according to one embodiment of the present disclosure. FIG. 7B is a schematic diagram of shifting the first facial image shown in FIG. 7A such that the nosal tip feature point NTEP in the first facial image FI1 is aligned with the center point CP of the reference plane RS.

As shown in FIG. 7A, the first facial image FI1 is exemplified by the facial image of which the facial expression is happy, and the first facial image includes the nosal tip feature point NTEP and the connection line EL between two eyes, in which the nosal tip feature point NTEP is located at the tip of the nose and the connection line EL between two eyes is the line passing through both eyes. The reference plane RS is the plane overlapping the first facial image FI1, and the reference plane RS includes the center point CP and the horizontal line HL passing through the center point CP.

As shown in FIG. 7B, the image calibration module 260 shifts the first facial image FI1 such that the nosal tip feature point NTEP in the first facial image FI1 is aligned with the center point CP of the reference plane RS.

In step S242, the image calibration module 260 rotates the shifted first facial image FI1 such that the connection line EL between two eyes in the shifted first facial image FI1 is parallel to the horizontal line HL of the reference plane RS. Specifically, reference is made to FIG. 7C, which illustrates a schematic diagram of rotating the shifted first facial image shown in FIG. 7B such that the connection line EL between two eyes in the shifted first facial image is parallel to the horizontal line HL of the reference plane RS to form the second facial image FI2.

Figure 7C:
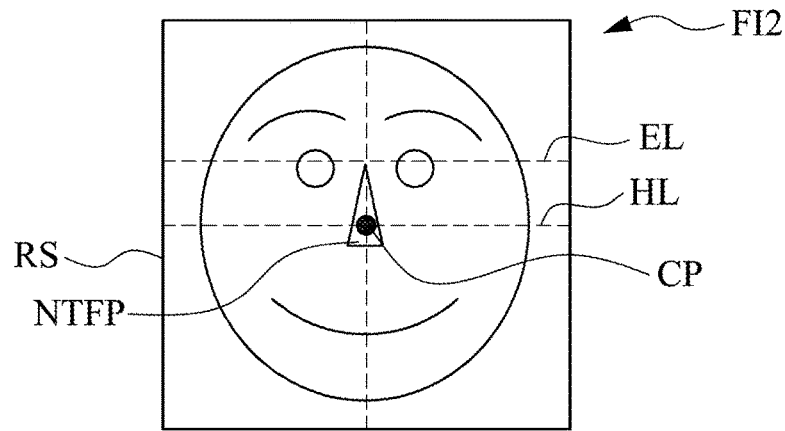
FIG. 7C is a schematic diagram of rotating the shifted first facial image shown in FIG. 7B such that a connection line between two eyes in the shifted first facial image is parallel to a horizontal line of the reference plane to form a second facial image.

As shown in FIG. 7C, the second facial image FI2 is formed by shifting and rotating the first facial image FI1.

In step S250, the image calibration module 260 uses Difference of Gaussian (DoG), Sobel operator or Laplace operator to sharpen the second facial image FI2. In detail, the image calibration module 260 performs a difference operation on eight pixels surrounding each of the pixels of the second facial image IF2 to sharpen the second facial image IF2.

Figure 7D:
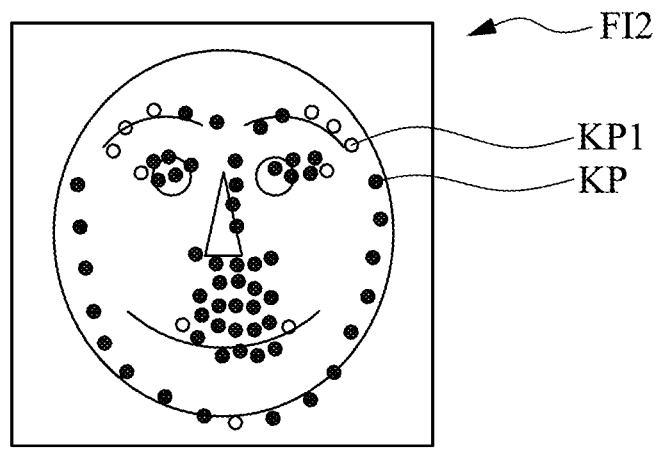
FIG. 7D is a schematic diagram of marking key points in the second facial image shown in FIG. 7C.
Figure 7E:
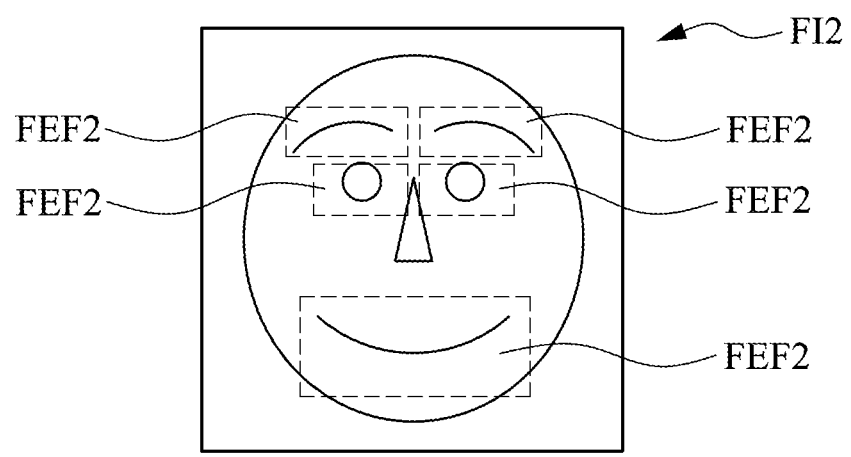
FIG. 7E is a schematic diagram of selecting a facial expression feature in the second facial image shown in FIG. 7C according to the key points shown in FIG. 7D.

In step S260, the facial expression feature capturing model 211 may output the facial expression feature FEF2 according to the sharpened second facial image FI2. Specifically, reference is made to FIG. 7D and FIG. 7E. FIG. 7D is a schematic diagram of marking key points KP in the second facial image FI2 (especially the sharpened second facial image FI2) shown in FIG. 7C, and FIG. 7E is a schematic diagram of selecting the facial expression feature FEF2 in the second facial image IF2 shown in FIG. 7C according to the key points KP shown in FIG. 7D.

As shown in FIG. 7D, the facial expression feature capturing model 211 can mark plural of key points KP in the second facial image FI2 according to the contour of the face and the characteristics of the facial features, for example, the left eyebrow, the right eyebrow, the left eye, the right eye, the mouth, the forehead, the nose, and the contour of face in the second facial image FI2 are marked with the corresponding key points KP, and the elliptic regression is used to select the first key points KP1 among the key points KP. Further, in the present embodiment, the number of the first key points KP1 is eleven, in which each of the left eyebrow and the right eyebrow has three, each of the left eye and the right eye has one, and the mouth has three. It should be noted that the number and the position of the key points KP and the first key points KP1 shown in FIG. 7D are exemplified, and it is not limited thereto.

In addition, as shown in FIG. 7D, the first key points KP1 corresponding to the left eyebrow, the right eyebrow, the left eye, the right eye, and the mouth are marked to select the facial expression feature FEF2 in the second facial image FI2, in which the facial expression feature FEF2 includes the left eyebrow feature, the right eyebrow feature, the left eye feature, the right eye feature, and the mouth feature.

Furthermore, since the facial expression of the second facial image FI2 is happy, the left eyebrow feature, the right eyebrow feature, the left eye feature, the right eye feature, and the mouth feature of the facial expression feature FEF2 should conform to the facial features of happiness, for example, the mouth feature is that the corner of the mouth is raised. On the condition that the mouth feature is the corner of the mouth being raised, it means that the position of the first key point KP1 marked at the corner of the mouth will move upwards while comparing to the expressionless expression.

In step S270, the recognition module 240 compares the facial expression feature FEF2 with the known facial expression features KFEF, and makes the facial expression feature FEF2 correspond to a known facial expression feature KFEF2 of the known facial expression features KFEF. Specifically, since the facial expression feature FEF2 conforms to the facial expression of happiness, the recognition module 240 selects the known facial expression feature KFEF2 that conforms to the facial feature of happiness among the known facial expression features KFEF in the feature database 220, in which the known facial expression feature KFEF2 and the facial expression feature FEF2 are not exactly the same and there is the difference between them. In short, both the facial expression feature FEF2 and the known facial expression feature KFEF2 conform to the facial expression of happiness, but there is the slight difference between them. For example, the mouth features of the facial expression feature FEF2 and the known facial expression feature KFEF2 both are the corner of the mouth being raised, but the magnitudes of the raises are not exactly the same.

In step S280, the adjusting module 250 adjusts the facial expression feature capturing model 211 to reduce the difference between the facial expression feature FEF2 and the known facial expression feature KFEF2. In detail, the associated parameters of the facial expression feature capturing model 211 can be adjusted by stochastic gradient descent (SCD) to reduce the difference between the facial expression feature FEF2 and the known facial expression feature KFEF2.

The adjusted facial expression feature capturing model 211 can perform more accurate facial expression recognition on the facial image that needs to be processed by the facial expression feature recognition, so that the facial expression feature FEF2 captured by the adjusted facial expression feature capturing model 211 is able to be closer to the known facial expression feature KFEF2 in the feature database 220 to achieve the purpose of adaptability.

Accordingly, every time the facial expression feature capturing model 211 performs the facial expression feature recognition on the unmarked facial image, the adjusting module 250 will correspondingly adjust the parameters of the facial expression feature capturing model 211 so that the facial expression feature capturing model 211 is continuously trained to enhance the facial expression feature recognition ability of the facial expression feature capturing model 211 and achieve the purpose of adaptability and personalization; moreover, it further has the effect of adjusting the parameters of the facial expression feature capturing model 211 online; furthermore, the problem of conceptual drift is also less likely to occur.

As mentioned above, by the training module, the feature database, the capturing module, the recognition module, and the adjusting module, the facial expression recognition training system of the present disclosure enables the facial expression feature capturing model to be continuously trained to enhance the facial expression feature recognition ability of the facial expression feature capturing model and achieve the purpose of adaptability and personalization; moreover, it further has the effect of adjusting the parameters of the facial expression feature capturing model online; furthermore, the problem of conceptual drift is also less likely to occur.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A facial expression recognition training system, characterized by comprising:
 a training module configured to train a facial expression feature capturing model according to a plurality of known facial images;
 a feature database configured to store a plurality of known facial expression features of the plurality of known facial images;
 a capturing module configured to continuously capture a plurality of first facial images, wherein the facial expression feature capturing model outputs a plurality of facial expression features of the plurality of first facial images according to the plurality of first facial images;

a recognition module configured to compare the plurality of facial expression features with the plurality of known facial expression features, and make the plurality of facial expression features correspond to the plurality of known facial expression features accordingly;

an adjusting module configured to adjust the facial expression feature capturing model to reduce differences between the plurality of facial expression features and the plurality of known facial expression features corresponding to the plurality of facial expression features; and an image calibration module configured to correct each of the plurality of first facial images to form a second facial image, and sharpen the second facial image, wherein the facial expression feature capturing model recognizes and outputs the plurality of facial expression feature to the recognition module according to the sharpened second facial image, and the recognition module compares the plurality of facial expression feature which is processed by the image calibration module with the plurality of known facial expression features.

2. The facial expression recognition training system of claim 1, characterized in that the facial expression feature capturing model comprises a convolutional neural network or a neural network.

3. The facial expression recognition training system of claim 1, characterized in that the image calibration module is configured to align facial features of each of the plurality of first facial images with each other.

4. The facial expression recognition training system of claim 1, characterized in that the image calibration module is configured to shift each of the plurality of first facial images with respect to a reference plane such that a nosal tip feature point in each of the plurality of first facial images is aligned with a center point of the reference plane, and rotate each of the plurality of shifted first facial images such that a connection line between two eyes in the each of the plurality of shifted first facial images is parallel to a horizontal line of the reference plane, so as to form the second facial image.

5. A facial expression recognition training method, characterized by comprising:

training a facial expression feature capturing model according to a plurality of known facial images;

storing a plurality of known facial expression features of the plurality of known facial images;

capturing a plurality of first facial images;

outputting a plurality of facial expression features according to the plurality of first facial images;

comparing the plurality of facial expression features with the plurality of known facial expression features, and making the plurality of facial expression features correspond to the plurality of known facial expression features accordingly; and adjusting the facial expression feature capturing model to reduce differences between the plurality of facial expression features and the plurality of known facial expression features corresponding to the plurality of facial expression features, wherein the step of outputting the facial expression features according to the first facial images comprises:

correcting each of the plurality of first facial images with respect to a reference plane to form a second facial image;

sharpening the second facial image; and recognizing the plurality of facial expression features according to the sharpened second facial image.

6. The facial expression recognition training method of claim 5, characterized in that the step of sharpening the second facial image comprises:

using Difference of Gaussian (DoG), Sobel operator or Laplace operator to sharpen the second facial image.

7. The facial expression recognition training method of claim 5, characterized in that the facial expression feature capturing model comprises a convolutional neural network or a neural network.

8. The facial expression recognition training method of claim 5, characterized in that the step of correcting the plurality of first facial images with respect to the reference plane to form the second facial image comprises:

shifting the plurality of first facial images with respect to the reference plane such that a nosal tip feature point in the plurality of first facial images is aligned with a center point of the reference plane; and rotating the plurality of shifted first facial images such that a connection line between two eyes in the each of the plurality of shifted first facial images is parallel to a horizontal line of the reference plane, so as to form the second facial image.

* * * * *